United States Patent [19]
Baker

[11] Patent Number: 4,979,658
[45] Date of Patent: Dec. 25, 1990

[54] BACKPACK/SADDLEBAG SYSTEM

[76] Inventor: Gretchen E. Baker, 36 Clarewood La., Oakland, Calif. 94618

[21] Appl. No.: 468,631

[22] Filed: Jan. 23, 1990

Related U.S. Application Data

[63] Continuation-in-part of Ser. No. 226,879, Jul. 27, 1988, which is a continuation of Ser. No. 629,312, Jul. 9, 1984, abandoned.

[51] Int. Cl.⁵ ............................ A45F 4/02; B62J 9/00
[52] U.S. Cl. ...................................... 224/153; 224/31; 224/32 A
[58] Field of Search .................... 224/31, 32 R, 32 A, 224/42.01, 42.11, 151, 153

[56] References Cited

U.S. PATENT DOCUMENTS

| | | | |
|---|---|---|---|
| 2,813,602 | 11/1957 | MacArthur, Jr. | 224/42.11 X |
| 3,938,716 | 2/1976 | Jackson et al. | 224/31 X |
| 4,258,869 | 3/1981 | Hilgendorff | 224/32 A |
| 4,442,960 | 4/1984 | Vetter | 224/32 A |
| 4,460,114 | 7/1984 | Grenier | 224/32 R |
| 4,491,258 | 1/1985 | Jones | 224/153 |
| 4,577,786 | 3/1986 | Dowrick et al. | 224/32 A |
| 4,580,706 | 4/1986 | Jackson et al. | 224/32 A |
| 4,869,408 | 9/1989 | Lutz | 224/32 A |

FOREIGN PATENT DOCUMENTS

| | | | |
|---|---|---|---|
| 3532332 | 3/1987 | Fed. Rep. of Germany | 224/42.01 |
| 261128 | 10/1988 | Fed. Rep. of Germany | 224/32 A |
| 8503496 | 7/1987 | Netherlands | 224/32 A |
| 203581 | 6/1939 | Switzerland | 224/32 R |
| 17457 | of 1912 | United Kingdom | 224/32 R |

Primary Examiner—Henry J. Recla
Assistant Examiner—Robert M. Fetsuga
Attorney, Agent, or Firm—Glen R. Grunewald

[57] ABSTRACT

A saddlebag in the form of a triangular prism including a rigid stiffening grid within one of its walls and a connection between the rigid stiffening grid and a carrying bar on a motorcycle with a hinge-like connection and with a downwardly facing wall including a closure whereby the closure can be swung to an upward position around the hinge-like connection to provide access to the interior of the saddlebag without spilling its contents, and the saddlebag being connectable symmetrically with another saddlebag to form a backpack.

6 Claims, 3 Drawing Sheets

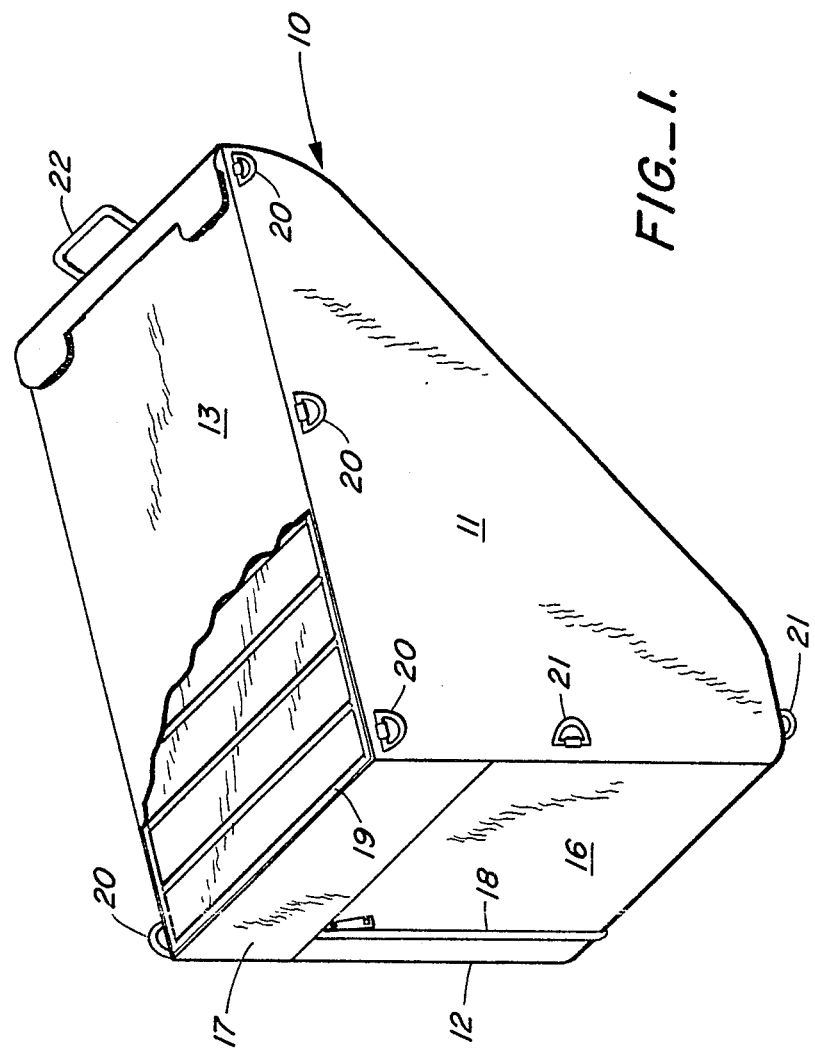
FIG._1.

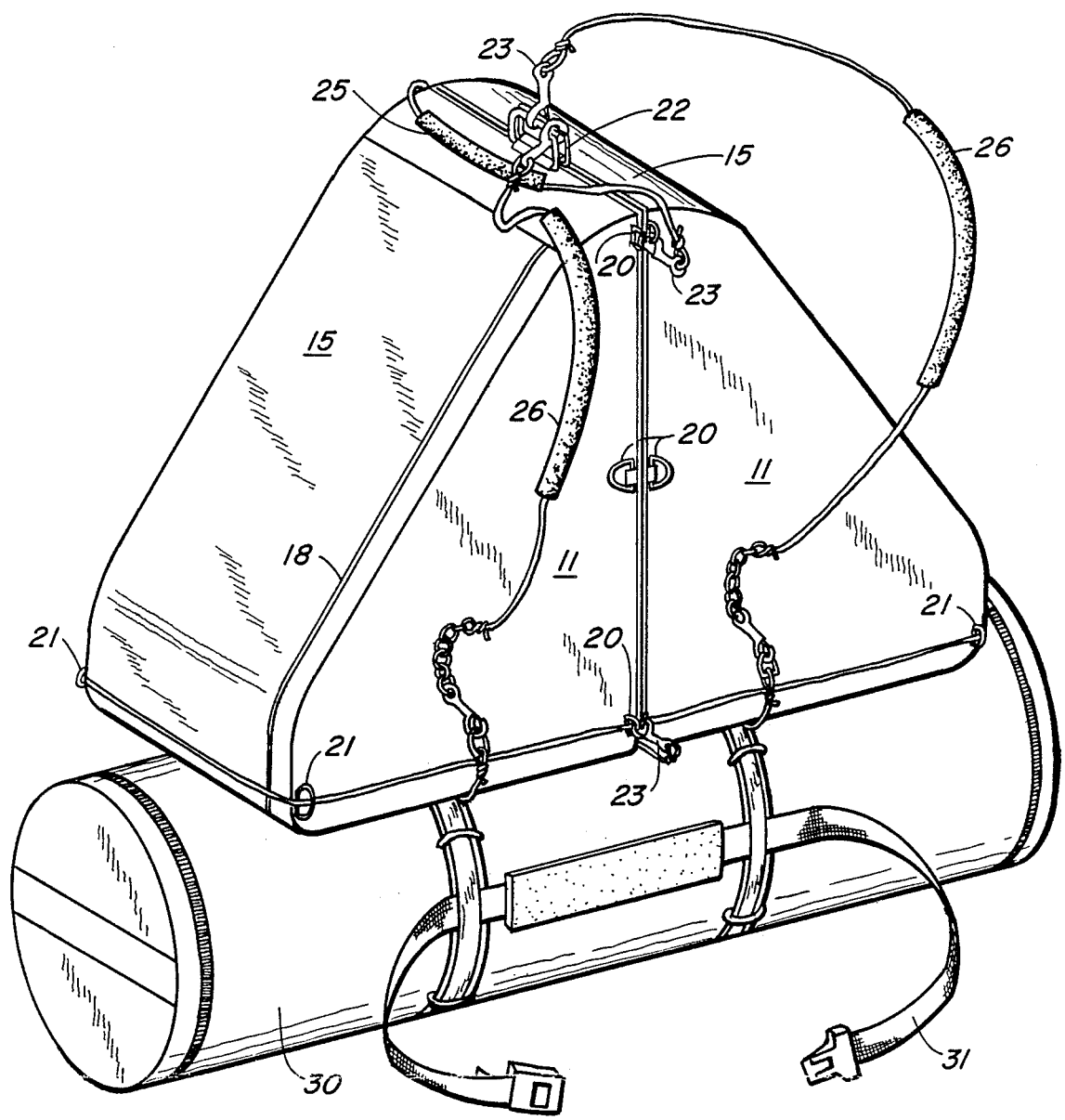
FIG._2.

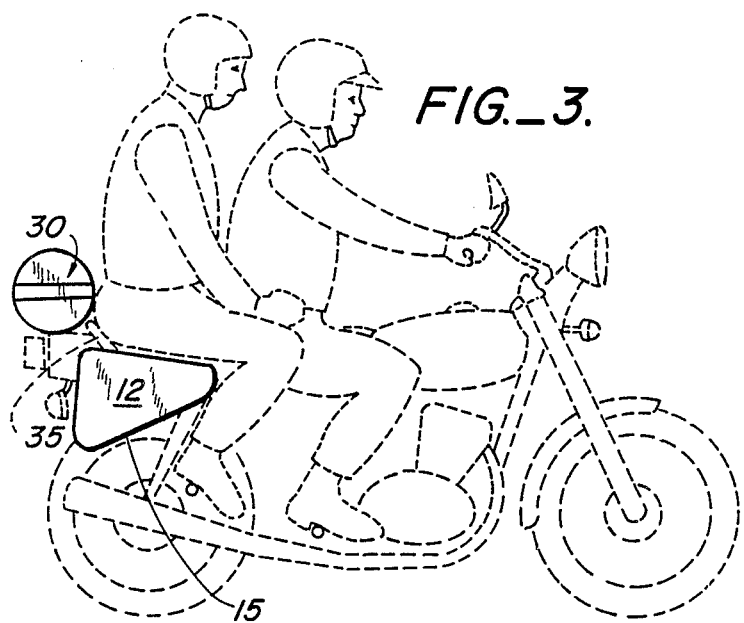
FIG._3.
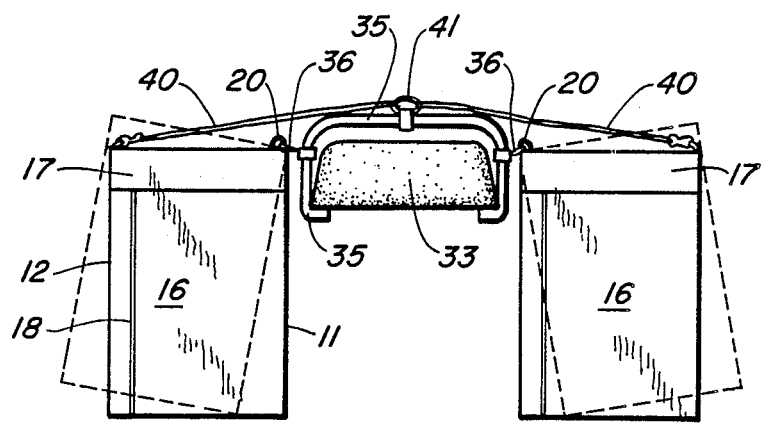
FIG._4.
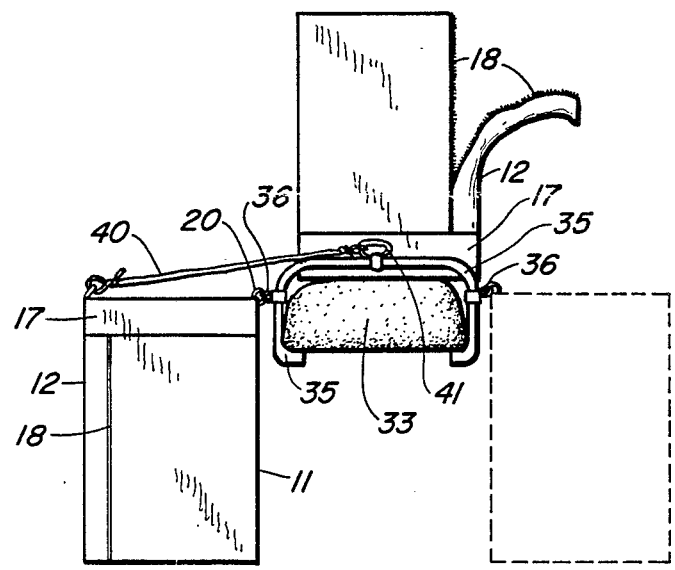
FIG._5.

BACKPACK/SADDLEBAG SYSTEM

CROSS-REFERENCE

This application is a continuation-in-part of application Ser. No. 07/226,879, filed July 26, 1988, and entitled BACKPACK/SADDLEBAG SYSTEM, which in turn is a continuation of U.S. patent application Ser. No. 06/629,312 filed July 9, 1984 for BACKPACK-SADDLEBAG SYSTEM, now abandoned.

TECHNICAL FIELD

This invention is in the field of saddlebags that are useful for luggage for a motorcycle and as a backpack.

BACKGROUND ART

Luggage used for motorcycles is usually in the form of saddlebags. Saddlebags usually are used as a pair of symmetric bags, one positioned on each side of the motorcycle, suspended from the saddle or fender to hang on opposite sides of the rear wheel. Many problems are associated with motorcycle saddlebags.

One problem is that the saddlebags are vulnerable to theft or damage when the motorcycle is left unattended. Saddlebags that are made of hard material and permanently fixed to the motorcycle deter thieves and vandals but they are heavy, inflexible and not readily usable as luggage. Specifically, a user cannot detach and carry a permanently fixed saddlebag into a hotel. The contents must be removed from a hard saddlebag and carried as individual items rather than contained in luggage. Many times motorcycles are used as transportation to a backpacking site and hard saddlebags are useless as a backpack even if they are detachable from the motorcycle.

Soft saddlebags made of fabric and made to be easily detachable from the motorcycle are known but they too have many problems. Saddlebags are exposed to weather and they are subject to leakage through closures when standing in the rain or particularly when being driven through the rain. Soft saddlebags also are usually used in pairs so that when removed from a motorcycle they comprise two separate pieces of luggage leaving the user with no free hands. Also, two separate items of luggage are relatively useless in backpacking.

Saddlebags occupy positions adjacent the rear wheel of a motorcycle. Soft saddlebags attached to a motorcycle with straps are not stable in that they can move forward or backward with respect to the wheel or the straps can stretch when the bag is holding a heavy load. The instability makes the bags vulnerable to becoming entangled in moving parts of the cycle or coming in contact with hot parts of the exhaust system. It is also necessary that the saddlebags not interfere with the leg room required by a cyclist or by a passenger, and they must not interfere with operating a motorcycle or with easy mounting or dismounting of the cycle.

The saddlebags should also be attached firmly and snugly so that their position does not change during travel or when traversing bumpy or uneven terrain. It is also desirable for saddlebags to have easy access to all parts of their interiors.

DISCLOSURE OF THE INVENTION

This invention is a saddlebag for a motorcycle that avoids or greatly mitigates the above-noted problems. The saddlebag of this invention is made of flexible material, is connectable to a motorcycle with an easily engagable and disengagable hinge-like connection that permits it to swing from a position beside the rear wheel of the motorcycle to a position above the rear wheel of the motorcycle. In normal carrying position the saddlebag of this invention is carried beside the wheel, and the opening into the interior of the bag is facing downwardly or vertically, whereby it is not penetrated by rain. When access to the interior of the saddlebag of this invention is desired, the bag is swung around its hinge-like connection, whereby the downwardly facing opening faces upwardly, and access to the saddlebag interior can be attained without spilling its contents.

The saddlebag of this invention is usually used in pairs, and each member of the pair is symmetric to the other. The pairs can be used together with shoulder straps to form a unitary backpack.

The upper wall of the saddlebag, in its normal orientation on a motorcycle during traveling, includes a stiffening frame to provide stiffness and structural strength to the flexible material from which the saddlebag is made, whereby the upper wall may be maintained horizontal in use, and the bag hangs from it in a stable position. In a preferred embodiment the saddlebag of the this invention includes means for attaching a bed roll or other elongated luggage piece which may be carried separately on a motorcycle but connected to the saddlebags when they are in their backpack configuration to form a unitary backpack assembly.

BRIEF DESCRIPTION OF THE DRAWINGS

FIG. 1 is a perspective view partly cut away of a saddlebag embodying this invention.

FIG. 2 is a perspective view of two saddlebags embodying this invention as shown in FIG. 1 connected to form a backpack.

FIG. 3 is a view of a saddlebag illustrated in FIG. 1 connected to a motorcycle.

FIG. 4 is a rear view of the saddle of a motorcycle having two saddlebags embodying this invention fixed thereto in travelling position.

FIG. 5 is the view of FIG. 4 with one saddlebag in position to give the user access to its interior.

BEST MODE FOR CARRYING OUT THE INVENTION

FIG. 1 illustrates the invention in its most general form. The saddlebag of FIG. 1 has a first side 11 that is symmetrical to and spaced from a second side 12 which is not visible in FIG. 1. The sides are connected to walls 13, 15 and 16. Wall 15 is not visible in FIG. 1 but is seen in FIG. 2. In the illustrated embodiment, wall 15 forms an acute angle with both wall 13 and wall 16 while walls 13 and 16 form a right angle with respect to each other whereby the saddlebag has a generally right triangular configuration. A closure 18 in the form of a zipper, provides an opening through walls 15 and 16, and a flap 17 is provided over the top of wall 16 so that the open end of the closure is positioned under the flap to protect that open end from being penetrated by water. The cutaway portion of wall 13 reveals that a stiffening grid 19 is provided beneath the flexible wall 13 to hold it rigid. Grid 19 preferably is made of metal but it may be made of any strong, rigid material. Grid 19 may be within the interior of saddlebag 10 positioned beneath wall 13, or it may be sandWiched between one or more layers of material such as canvas, water-repellant nylon or even stiffer material such as masonite or linoleum.

Saddlebag 10 is provided with exterior connecting means such as D-rings 20 which preferably are connected to the saddlebag by passing through slots through sides 11 and 12 and connecting directly to stiffening grid 19. The saddlebag may also be provided with additional D-rings 21 that are sewed to the sides or walls at appropriate positions to perform different functions, and with a handle 22 connected to stiffening grid 19. Handle 19 is useful for carrying the saddlebag 10 when it is disconnected from the cycle or for connecting to shoulder straps as shown in FIG. 2.

FIG. 2 illustrates the saddlebags embodying this invention connected together to form a backpack. The saddlebags are connected with their sides 13 face-to-face so that the two stiffening grids 19 are adjacent one another. The bags are connected to one another with suitable clips such as clips 23 passing through adjacent D-rings 20, and shoulder straps 26 are connected through both handles 22 at the top of the backpack and to D-rings 21. Other D-rings 21 may be used to secure a rope passing around the two bags, as illustrated, and other D-rings 20 may be held together with other clips 23 as illustrated. D-rings 20 may also be employed to attach a carrying handle 25 to the upper portion of the backpack to assist in carrying it when it is not carried by shoulder straps 26, as when moving it from one place to another within a campsite.

FIG. 2 also illustrates that the invention includes the use of auxiliary luggage 30. Auxiliary luggage 30 is shown to be in the form of a cylindrical bag connected to the pair of saddlebags 10 with suitable straps so that it hangs from walls 16. Auxiliary luggage may also be used to mount a waist strap 31, such as those conventionally used with backpacks to assist in supporting the weight of the backpack.

FIG. 3 illustrates the saddlebag of this invention as it is connected to a conventional motorcycle. FIG. 3 illustrates a motorcycle, the driver, and a passenger in phantom. FIG. 3 further illustrates that the saddlebag of this invention may be mounted on a motorcycle without interfering with the operation of the motorcycle or the legroom available to a passenger. As illustrated in FIG. 3, the auxiliary luggage is carried as a bedroll would be carried on a motorcycle. As particularly illustrated in FIGS. 4 and 5, in normal carrying position the wall 13 is the uppermost wall of the saddlebag and horizontal. Wall 13 with its rigid reinforcing grid permits the bag to hang vertically from wall 13 without losing its shape. In addition, wall 13 is a continuous wall having no openings in it through which water can penetrate so that items carried within the saddlebag are completely free from moisture passing through wall 13 even when the speed of the motorcycle tends to drive moisture through openings.

Most conventional motorcycles have a saddle 33 partly surrounded by a bar 35 useful to secure a saddlebag, to protect a saddle from abrasion or to provide a handhold for a passenger. In the illustrated embodiment bar 35 is provided with snap hooks that connect to D-rings 20 to form a hinge-like connection between the saddlebag and the bar 35. Thus, the saddlebag as illustrated in FIG. 4 hangs beside the rear wheel of the cycle with closure 18 facing downwardly when in the normal traveling position. However, when access to the interior of the bag is desired, it may be swung around the hinge-like connection to the position shown in FIG. 5 so that wall 13 is the lowermost wall and the closure around walls 15 and 16 faces upwardly. When the closure 18 is open, the contents of the saddlebag do not spill out as they would if it were opened in the position shown in FIG. 4, but the contents of the bag remain dry because the closure was facing downwardly during traveling. FIGS. 4 and 5 also illustrate that the saddlebags may be maintained with walls 13 horizontal during travelling by the use of straps or cables 40 connected between a ring 41 on bar 35 and a D-ring 20 on the edge of the saddlebag most remote from the saddle. The length of straps or cables 40 is selected to limit the amount that a saddlebag may swing around its hinge-like connection whereby it cannot swing into the spokes or other moving parts of the cycle.

The utility of this invention can be demonstrated by a typical series of events when a cyclist wishes to use his cycle for transportation to a backpacking site. Two saddlebags embodying this invention are packed with the appropriate luggage that the user wishes to take on a backpacking trip. The saddlebags are then connected with appropriate connectors to the carrying bar of the cycle, one hanging on each side of the saddle, for example as shown in FIG. 4. As shown in FIG. 4 the closures 18 face vertically or downwardly, and their ends, where complete closure cannot be accomplished, are under the flap 17. Straps 40 are then connected to bar 35 and straps 40 are secured to prevent the saddlebags from swinging toward the spokes or other moving parts of the cycle. If desired, auxiliary luggage 30 may be positioned on the cycle as shown in FIG. 3.

The cycle will then be driven to the backpacking site with all luggage packed as in conventional saddlebags. If access to a saddlebag is required during the trip, the saddlebag is swung around the hinge-like connection as shown in FIG. 5, the closure is opened a sufficient amount to provide the desired amount of access to the interior of the saddlebag, and articles in the saddlebag may be removed or additional articles may be inserted into its interior space. When access is no longer required, closure 18 may be closed and the bag swung around its hinge-like connection to the position shown in FIG. 4.

When the user reaches the backpacking site, the hinge-like connections are disconnected, straps 40 are released, and the two saddlebags are positioned with their walls 13 face-to-face as shown in FIG. 2. Connections between adjacent D-rings are made, and shoulder straps 26 are assembled as shown. If desired, auxiliary luggage 30 is connected to what are now normally horizontal walls 16 to hang below them, and a waist strap 31 is installed. The user may then put on the backpack in the conventional way, specifically with shoulder straps 26 encircling the shoulders and waistband 31 encircling the waist, whereby the device of this invention becomes an effective and useful backpack. When backpacking is completed, the abovedescribed process is reversed to convert the backpack to two saddlebags for the next trip on the cycle.

I claim:

1. A saddlebag for use with a motorcycle having saddlebag-carrying means positioned horizontally in normal use of said motorcycle and at a higher elevation than the rear wheel of said motorcycle, said saddlebag comprising a first side; a second side; first, second and third walls, with each wall having peripheral edges connecting to peripheral edges of each of said first and second sides to form an enclosed volume, the edge between said first wall and a side including means to form a hinge-like attachment with said saddlebag-carrying means whereby said saddlebag may swing around said attachment from a position beside the rear wheel of said motorcycle to a position above said rear wheel, said second wall facing downward when said saddlebag is in a position beside said rear wheel, said second wall having a closable opening providing access to said enclosed volume and said first wall being continuous and having no opening therein.

2. The saddlebag of claim 1 wherein said first wall and said second wall meet at an acute angle.

3. The saddlebag of claim 1 including stiffening means for said first wall.

4. the saddlebag of claim 3 wherein said means to form a releasable hinge-like attachment is connected to said stiffening means.

5. Two saddlebags in accordance with claim 1 positioned symmetrically about the planes of their first walls with their first walls in contact and means to attach shoulder straps to carry said two saddlebags with the planes of their first walls substantially vertical.

6. The saddlebags of claim 5 including auxiliary luggage attached to said third walls.

* * * * *